4,697,889

United States Patent [19]
Takubo et al.

[11] Patent Number: 4,697,889
[45] Date of Patent: Oct. 6, 1987

[54] LIGHT SHUTTER ARRAY ELEMENT

[75] Inventors: Yoneharu Takubo, Neyagawa; Yasutaka Horibe, Ibaraki; Nobue Yamanishi, Higashiosaka, all of Japan

[73] Assignee: Matsushita Electric Industrial Co., Ltd., Osaka, Japan

[21] Appl. No.: 798,029

[22] Filed: Nov. 14, 1985

[30] Foreign Application Priority Data

Nov. 14, 1984 [JP] Japan .................. 59-239808

[51] Int. Cl.⁴ .................................... G02F 1/03
[52] U.S. Cl. ........................... 350/392; 350/356
[58] Field of Search ..................... 350/392, 356

[56] References Cited
FOREIGN PATENT DOCUMENTS 50-130464 10/1975 Japan .

OTHER PUBLICATIONS

PLZT Linear Array Page Composer, Ferroelectrics, 1976, vol. 10, pp. 35–38.

Primary Examiner—Bruce Y. Arnold
Attorney, Agent, or Firm—Wenderoth, Lind & Ponack

[57] ABSTRACT

An optoelectronic shutter array element useful as a writing head for an optical printer and using a transparent ceramic substrate having an electrooptical effect, which element reduces abrupt change in the electric field strength so as to improve the stability of the permeability of the optoelectronic shutter, the element being provided on the main surface of the transparent ceramic substrate with grooves having therein the electrodes with the electrodes covering the bottom and side wall surfaces of the grooves and the main surface of the substrate in the vicinity of the grooves.

7 Claims, 6 Drawing Figures

LIGHT SHUTTER ARRAY ELEMENT

BACKGROUND OF THE INVENTION

1. Field of the Invention

The present invention relates to a solid-state light shutter array element usable for a writing head of an optical printer.

2. Description of the Prior Art

Recently, computers have progressed to promote automation in every technical field, and the field of information processing technique has been remarkably improved. A printer for use as the information output apparatus is a component playing a very important role. Various types of printers have actively been developed, among which the optical printer, a kind of non-impact printer, has been the most prominent one. A device comprising a light shutter formed in an array using the electro-optical effect is used as the writing device for the optical printer.

At present, a light shutter array element which employs an electro-optical material is well known. The element comprises a transparent substrate of lanthanum modified lead zirconate titanate (PLZT) having a composition of La/Zr/Ti=9/65/35 having very large Kerr effect, a plurality of opposing electrodes formed on the substrate, and polarizing plates disposed at both sides of the substrate.

The principle of operation of the light shutter is that an electric voltage is applied between the opposite electrodes formed on the PLZT substrate to cause birefringence thereon, thereby varying the polarization condition of an incident light. The light beam shutter using the PLZT substrate is characterized in that the response speed is fast, which has hitherto been fully studied and also examined in the light shutter array.

A light shutter array using a PLZT substrate was reported in "PLZT LINEAR ARRAY PAGE COMPOSER" by George R. Laguna, Ferro-electrics Vol. 10 (1976), pp. 35-38, and Elektronic Industrie Vol. 6 (1980). p. 26.

Such PLZT light shutter array, however, has a large problem in that the permeability will vary after a long period of use of the shutter array. The reason for this is that the electrostriction phenomenon of the PLZT material causes mechanical stress on the PLZT substrate. Especially, the stress is caused by variation in the electrostriction caused by abrupt variation in the electric field distribution at the end portion of each electrode. An improvement for solving the above problem has been disclosed in Japanese Laid-Open Patent Application No. 50-130464. This improvement, however, is very difficult to achieve and is not applicable to a light shutter array having many light shutter portions.

SUMMARY OF THE INVENTION

An object of the present invention is to provide a light shutter array element having less variation in the permeability caused by being driven for a long time and high in reliability.

In order to attain this object, a light shutter array element of the invention comprises: a transparent ceramic substrate having the Kerr effect and having grooves on its main surface; a plurality of opposing electrodes formed on the inner wall surfaces of the grooves and a part of the main surface of the transparent ceramic substrate in the vicinity of the grooves. As an electric field applied to the transparent substrate in its thicknesswise direction increases, the concentration of the electric field at the ends of the electrodes is reduced.

Furthermore, an insulating resin film may be provided to cover the electrodes and a part of the main surface of the transparent ceramic substrate in the vicinity of the electrodes, thereby enabling the above effect to be further improved.

The above and other objects and features of the invention will more fully appear from the following description taken in connection with the accompanying drawings.

DESCRIPTION OF THE PREFERRED EMBODIMENT

Figure 1:
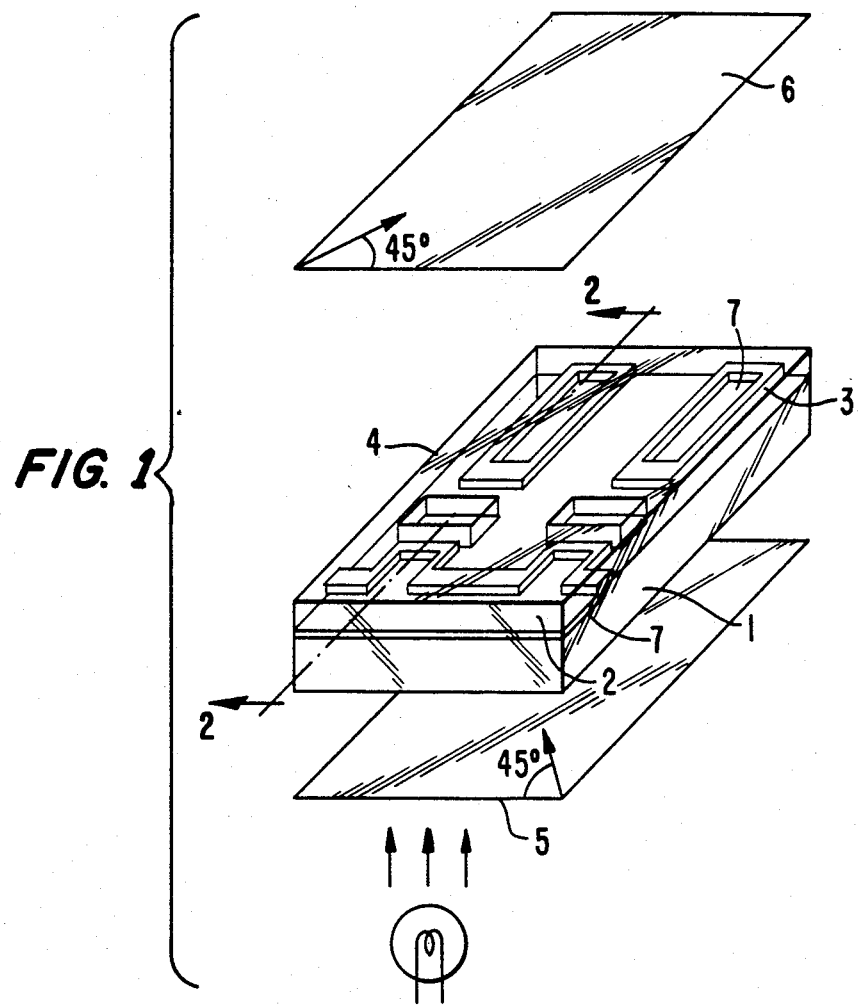
FIG. 1 is an exploded perspective view of a first embodiment of a light shutter array element of the invention.
Figure 2:
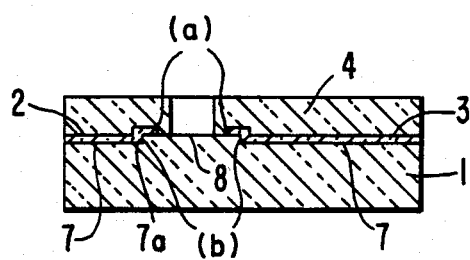
FIG. 2 is a sectional view taken on the line 2—2 in FIG. 1.

Referring to FIG. 1 showing a first embodiment of light shutter array element of the invention, reference numeral 1 designates a PLZT substrate, 1 designates a common electrode provided on a main surface of the PLZT substrate 1, and 3 designates a group of electrodes for applying a voltage in spaced opposed relation to the common electrode 2 across the surface of said substrate. The electrodes 2 and 3 are formed on the bottom surfaces of grooves 7 and over a part of the main surface of the PLZT substrate in the vicinity of the grooves and on the wall 7a between the main surface and the bottom of the groove. Numeral 4 designates an insulating resin film formed on the electrodes and a part of the surface of the light shutter portion 8 in the vicinity of the electrodes, and 5 and 6 designate a light polarizer and a light analyser respectively, which are adapted to have polarizing axes of +45° and −45° respectively with respect to the direction of the electric field generated when the voltage is applied between the common electrode 2 and the voltage applied electrode group 3. FIG. 2 shows a sectional view taken along a line (A)-(B) in FIG. 1. In FIG. 2, the polarizers are not shown for simplication.

Next, an explanation will be given of the operation of the light shutter array element constructed as described above. When a light is irradiated into the polarizer 5 from the rear thereof, the light is linearly polarized by the polarizer 5, and the linearly polarized light is incident on the PLZT substrate 1. When no voltage is applied between the common electrode 2 and the voltage applying electrodes 3, the incident light, while keeping its polarizing direction, is transmitted through the PLZT substrate 1 and intercepted by the light analyser 6. On the other hand, when a voltage is applied between the common electrode 2 and the voltage applying electrode 3, the PLZT substrate 1 generates birefringence so that the polarized condition of the linearly polarized light is changed by the PLZT substrate 1 to be elliptically polarized light. Hence, a light in the polarizing direction identical with the polarization axis of the light analyser 6 is transmitted therethrough.

Now, it is known that the electrostriction phenomenon exists in the PLZT substrate, which generates a strain proportional to a square of the intensity of the electric field and the value of the strain is very large. Hence, when the voltage is applied between the common electrode 2 and the voltage applying electrodes 3 as described above, the strain corresponding to the intensity of the electric field as well as the birefringence is generated. The strain is not generated at the portion of the PLZT substrate 1 under the electrodes, but a large discontinuity of the electric field is caused at the border between the light shutter portion 8 and the electrode covered portion of the PLZT substrate 1.

In the first embodiment, the electrodes, as seen from FIG. 2, are formed on the inner wall surfaces of the grooves i.e. the bottom and the sides, and a part of the main surface of PLZT substrate 1 in the vicinity of the grooves. Therefore the electric field distribution in the thicknesswise direction of the PLZT substrate 1 is increased so as to reduce the necessary electric field at each portion, and simultaneously to reduce the concentration of the electric field at the end portion of each electrode (the portion (a) in FIG. 2) on the surface of PLZT substrate 1. Also, the portion (b) in FIG. 2 which would be structurally easy to be subjected to the concentration of stress, is covered with the electrodes to make the electric field zero so as not to cause strain. Furthermore, the portion (a) at the end of each electrode is covered with a resin film to reduce the difference of strain between the electrode and the shutter portion 8, thereby reducing stress caused by the strain created at the portions (a) and (b).

In the first embodiment, the PLZT substrate 1 is a (Pb 0.91, La 0.09) (Zr 0.65, Ti 0.35)$O_3$ substrate 300 $\mu$m thick, which has been sliced and polished. The grooves on the main surface of the PLZT substrate are formed by a chemical etching method using a photolithography technique. A liquid which is a mixture of $HF+HNO+H_2O$ is used for etching the PLZT substrate. The depth of the etching is about 5 $\mu$m. Then, Cr-Au is vapor-deposited on the entire surface of the PLZT substrate and the photolithography technique is again used to form a plurality of electrodes. The Cr-Au electrodes are about 1 $\mu$m in thickness. Next, polymide resin is used to form the resin film pattern by the photolithography technique. In FIG. 1, each electrode of the voltage applying electrode group 3 is 50 $\mu$m wide and the interval between the electrodes is 70 $\mu$m. In FIG. 2, the interval between the opposite grooves for the opposing electrodes on the light shutter portion is 60 $\mu$m, that between the opposing electrodes is 50 $\mu$m, and that between the opposing resin film portions is 40 $\mu$m.

Figure 3:
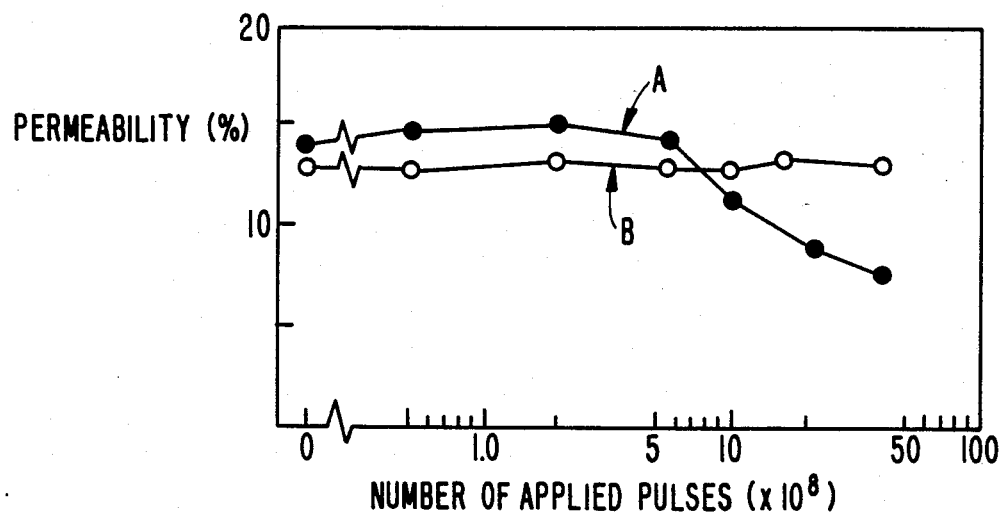
FIG. 3 is a graph showing variations in permeability with time of the light shutter array element in FIG. 1 and that of a conventional light shutter array element with planer type opposite electrodes, when driven for a long time.

The light shutter array element constructed as above showed its maximum permeability when a voltage of 100 V was applied thereto. Furthermore, we have examined variation with in permeability with time of the light shutter array element of the invention and of a conventional one having a planar construction, when rectangular waveform pulse of 100 V and 1 KHz is applied for a long time. FIG. 3 shows the results of the above examination, in which A designates the conventional light shutter array element and B the light shutter array element of the invention. As seen from FIG. 3, the element of conventional construction greatly changes in permeability when the number of pulse applications becomes more than $10^9$, while that of the invention shows small variation in permeability.

As a result, in the light shutter array element of the first embodiment, it can be said to be very effective for improving the stability for a long time drive. In other words the difference in intensity of electric field at the boundary between the shutter portion 8 and the electrode and the difference in strain are remarkably reduced.

Figure 4:
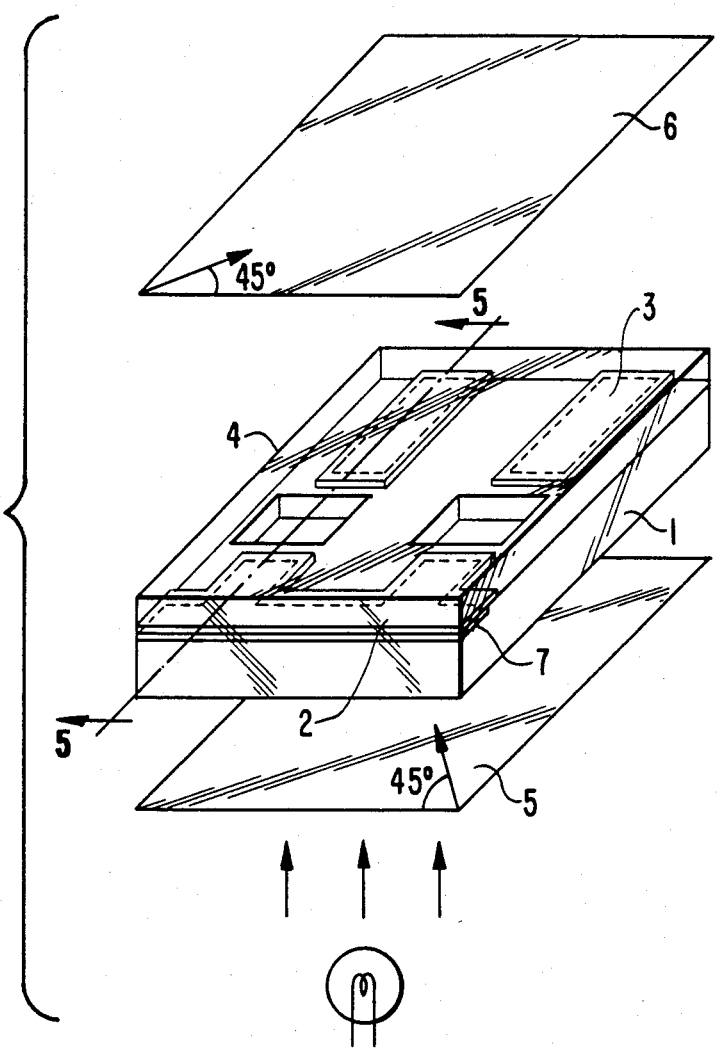
FIG. 4 is a perspective view of a second embodiment of a light shutter array element of the invention.
Figure 5:
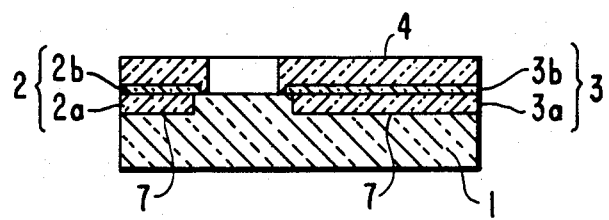
FIG. 5 is a sectional view taken on the line 5—5 in FIG. 4.

Referring to FIGS. 4 and 5 showing a second embodiment of the invention, the operating mechanism and basic construction thereof are same as those of the first embodiment. In the second embodiment, as seen from the sectional view in FIG. 5, electrodes 2 and 3 each comprises a first electrode 2a or 3a formed in each electrode accommodating groove 7 provided on the PLZT substrate 1 and a second electrode 2b or 3b provided to cover the first electrode and a part of the main surface of the PLZT substrate 1 in the vicinity of the first electrodes.

Figure 6:
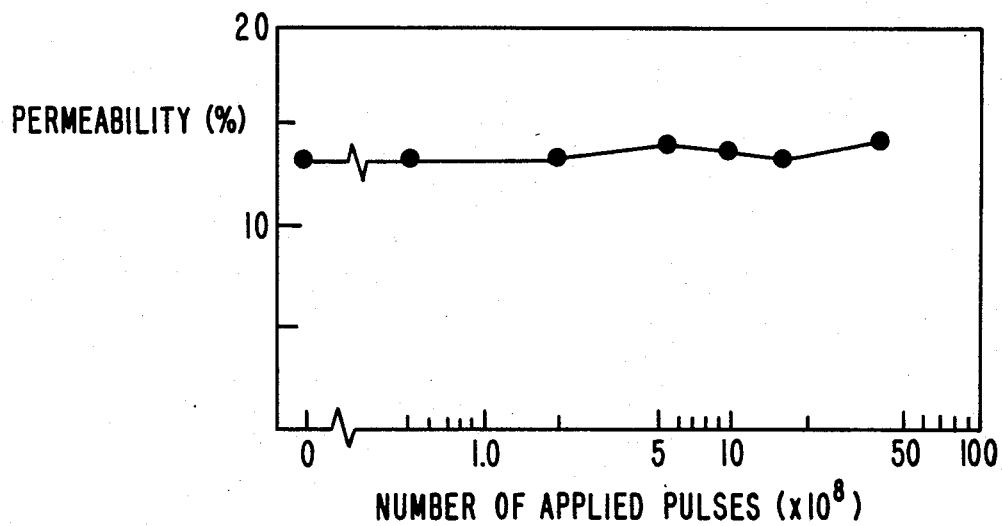
FIG. 6 is a graph showing variations in permeability with time of the second embodiment when driven for a long time.

Cr-Au is vapor-deposited on the substrate 1, and then the first electrodes are formed by the lift-off method. Then, Cr-Au are again vapor-deposited on the first electrodes and the PLZT substrate, and the second electrodes are formed by use of the photolithography technique. The first electrodes are about 2 $\mu$m thick, and the second electrodes are about 5000 Å thick. Other design conditions are the same as those of the first embodiment. FIG. 6 shows the result of variation in permeability with time under the same examination conditions as that of the first embodiment. As seen from FIG. 6 the variation of the permeability is very small even after the long time drive the same as with the first embodiment.

The above described embodiments are merely exemplary of the invention and may be modified variously within the scope of the invention defined solely by the appended claims.

What is claimed is:

1. A light shutter array element comprising:
   a transparent ceramic substrate having on a main surface thereof a plurality of electrodes in spaced opposed relation to each other across said main surface; and
   polarizing plates on both sides of said transparent ceramic substrate having different polarizing axes from each other, said transparent ceramic substrate having a plurality of spaced grooves provided in said main surface, said plurality of electrodes being on the bottom and side wall surfaces of said grooves and on a part of said main surface in the vicinity of said grooves.

2. The light shutter array element as set forth in claim 1, wherein said transparent substrate is a PLZT substrate.

3. A light shutter array element comprising;
   a transparent ceramic substrate having on a main surface thereof a plurality of electrodes in spaced opposed relation to each other across said main surface;
   polarizing plates on both sides of said transparent ceramic substrate having different polarizing axes from each other, said transparent ceramic substrate having a plurality of spaced grooves provided in said main surface, said plurality of electrodes being on the bottom and side wall surfaces of said grooves and on a part of said main surface in the vicinity of said grooves, and an insulating resin film covering said electrodes and a part of the main surface in the vicinity of the opposed ends of said electrodes.

4. The light shutter array element as set forth in claim 3, wherein said transparent ceramic substrate is a PLZT substrate.

5. A light shutter array comprising:

a transparent substrate having a plurality of grooves in its main surface;

polarizing plates provided on both sides of said transparent ceramic substrate and having different polarizing axes from each other;

first electrodes in and filling said grooves; and second electrodes on said first electrodes and a part of the main surface in the vicinity of said grooves of said substrate and in spaced opposed relation to said second electrodes in other grooves.

6. A light shutter array element as set forth in claim 5, further comprising an insulating resin film covering said second electrodes and a part of said main surface in the vicinity of the opposed portions of said second electrodes.

7. The light shutter array element as set forth in claim 5, wherein said transparent ceramic substrate is a PLZT substrate.

* * * * *